(12) United States Patent
Francois et al.

(10) Patent No.: US 7,983,339 B2
(45) Date of Patent: Jul. 19, 2011

(54) METHOD FOR CODING AN IMAGE SEQUENCE

(75) Inventors: Edouard Francois, Bourg des Comptes (FR); Dominique Thoreau, Cesson Sevigne (FR); Anne Lorette, Rennes (FR); Yannick Olivier, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 710 days.

(21) Appl. No.: 10/585,488

(22) PCT Filed: Jan. 3, 2005

(86) PCT No.: PCT/FR2005/050002
§ 371 (c)(1),
(2), (4) Date: Jul. 6, 2009

(87) PCT Pub. No.: WO2005/071972
PCT Pub. Date: Aug. 4, 2005

(65) Prior Publication Data
US 2009/0304080 A1    Dec. 10, 2009

(30) Foreign Application Priority Data
Jan. 7, 2004    (FR) ..................... 04 50038

(51) Int. Cl.
*H04N 7/12*    (2006.01)
*H04N 11/02*    (2006.01)
*H04N 11/04*    (2006.01)

(52) U.S. Cl. ......... 375/240.15; 375/240.01; 375/240.02; 375/240.12

(58) Field of Classification Search ............. 375/240.12, 375/240.16, 240.01, 240.02, 240.15
See application file for complete search history.

(56) References Cited

U.S. PATENT DOCUMENTS
5,793,895 A * 8/1998 Chang et al. ................. 382/236
(Continued)

FOREIGN PATENT DOCUMENTS
EP    1164794    12/2001
(Continued)

OTHER PUBLICATIONS
Patent Abstracts of Japan, vol. 2000, No. 4, Aug. 31, 2000 & JP 2000-032474 (Sharp Corp.).
(Continued)

*Primary Examiner* — Christopher Kelley
*Assistant Examiner* — Chikaodili Anyikire
(74) *Attorney, Agent, or Firm* — Robert D. Shedd; Robert B. Levy; Guy H. Eriksen

(57) ABSTRACT

The method comprises the steps for the:
  calculation of a rate of potential use of an entity of the picture k for a backward predictive coding of the picture k−s, according to the number of vectors of the backward motion vector field of the picture k−s pointing to the entity of the picture k or in its near surroundings and/or
  calculation of a rate of potential use of an entity of the picture k for a forward predictive coding of the picture k+p, according to the number of vectors of the forward motion vector field of the picture k+p pointing to the entity of the picture k or in its near surroundings,
  coding of the picture entity or the picture comprising the entity according to the rate of use of the picture entity.
The applications concern the hybrid type compression diagrams.

11 Claims, 7 Drawing Sheets

U.S. PATENT DOCUMENTS

Figure 1:
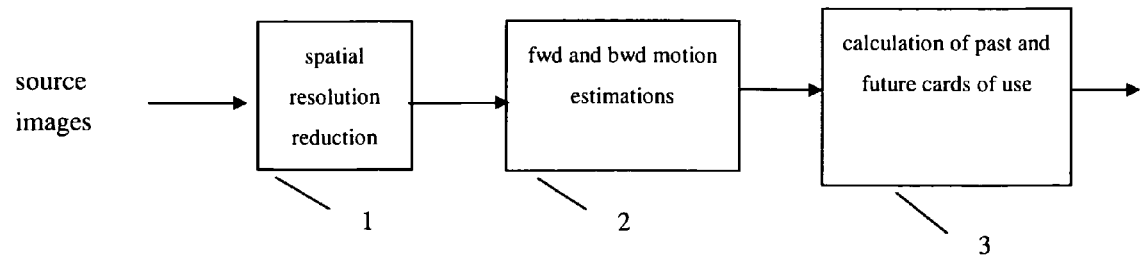

2003/0009764 A1* 1/2003 Krishnamachari ............ 725/93
2003/0206590 A1* 11/2003 Krishnamachari ...... 375/240.16

FOREIGN PATENT DOCUMENTS

| | | |
|---|---|---|
| JP | 11-155147 | 6/1999 |
| JP | 2000-32474 | 1/2000 |
| WO | WO 01/26379 | 4/2001 |
| WO | WO 03/094527 | 11/2003 |
| WO | WO 2004/002150 | 12/2003 |

OTHER PUBLICATIONS

Patent Abstracts of Japan. vol. 1999, No. 11, Sep. 30, 1999 & JP 11-155147 (Casio Comput Co. Ltd.).

Search Report Dated May 9, 2005.

* cited by examiner

METHOD FOR CODING AN IMAGE SEQUENCE

This application claims the benefit, under 35 U.S.C. §365 of International Application PCT/FR05/050002, filed Jan. 3, 2005, which was published in accordance with PCT Article 21(2) on Aug. 4, 2005 in French and which claims the benefit of French patent application No. 0450038, filed Jan. 7, 2004.

The invention relates to a method for coding a sequence of pictures, more particularly using a motion vector field.

The scope is that of video compression based on hybrid type diagrams, using motion compensation temporal prediction to reduce the temporal redundancy of successive pictures. The applications relate, among others, to the coding of pictures, the organisation of successive pictures into GOP, acronym for "Group Of Pictures".

In the existing video standards, such as MPEG-2, MPEG-4 part 2, different picture types are considered: I or intra-pictures which do not depend on any other pictures, P or predictive pictures which depend on past pictures, B or bi-directional pictures which depend on past and future pictures but cannot be used as reference pictures. In MPEG-4 part 10, these principles have been extended. A P-picture block can be predicted from a reference picture, this reference picture being able to be located in the past or the future. A block of a B-picture can be predicted from two reference pictures, these reference pictures can both be located in the past, in the future, or one in the past and the other in the future. The B-pictures are now called Bi-predictive pictures and can be used as reference pictures.

A GOP is structured from different types of pictures. For example, it can be constituted from a first I-picture, one P-picture every 3 pictures and two B-pictures between two I- or P-pictures. This structure is generally fixed and predetermined. The distance between the P-pictures and/or the distance between the I-pictures is fixed. The possibility of switching to the I mode is however often used to be able to manage the shot changes efficiently during cuts in the sequence or during fading. This fixed structure, even integrating minor GOP structure modifications according to the characteristics linked to the shots of the video sequence do not enable the optimized compression of video data to be achieved as it does not adapt to the local content of the video.

The choice of modes and coding parameters of a picture entity such as a block of pixels or picture macroblock depends, in a known manner, on a compromise between the coding cost of the picture and the quality of this picture. For this entity, the choice is made without taking its future behaviour into account. Thus, a coding of lower quality of a picture entity that can be used to predict one or more subsequent picture entities generates, if such is the case, a propagation of this lower quality or a extra coding cost.

Taking into account the instantaneous and not medium to long term properties of a picture may lead to allocating a large amount of bit-rate to parts of the picture or pictures that will be used hardly or not at all for the following images. Within a context of applications where the total bit-rate is limited, this is done to the detriment of other pictures or picture entities, which are potentially more interesting for the subsequent pictures to be coded, for example by using prediction.

For example, the choice of reference pictures in the GOP structure does not necessarily correspond to the pictures whose entities will have the most chance of being used in the prediction of the following pictures. The quality of coding is therefore not optimized.

The invention aims to overcome the disadvantages described above. Its object is a method for coding a sequence of pictures, a picture comprising picture entities, comprising a step for the:
calculation of a backward motion vector field of a picture k−s and/or a forward motion vector field of a picture k+p, corresponding to a motion estimation of entities respectively of the picture k−s to a following picture k and/or of the picture k+p to a previous picture k, s and p being non-null natural integers,
characterized in that it comprises steps for the:
calculation of a rate of potential use of an entity of the picture k for a backward predictive coding of the picture k−s, according to the number of vectors of the backward motion vector field of the picture k−s pointing to the entity of the picture k or in its near surroundings and/or
calculation of a rate of potential use of an entity of the picture k for a forward predictive coding of the picture k+p, according to the number of vectors of the forward motion vector field of the picture k+p pointing to the entity of the picture k or in its near surroundings,
coding of the picture entity or the picture comprising the entity according to the rate of use of the picture entity.

According to a particular implementation, the rate of potential use is also dependent upon the spatial distribution of the extremities of the motion vectors in the picture k, either of the backward motion vector field of a picture k−s, or of the forward motion vector field of a k+p.

According to a particular implementation, the rate of use calculated for each entity of the image k in obtained according to the following steps:
for a predetermined zone around this entity, determination of the extremities of the motion vectors of the vector field of the picture k−s or k+p,
calculation of a rate of use for this entity (i, j) in accordance with the number of extremities in the zone and, for each extremity, of the distance from this extremity to the entity (i, j).

According to a particular implementation, an iterative method is used on a group of P pictures preceding the picture k to calculate a rate of use for a backward predictive coding or following the picture k to calculate a rate of use for a forward predictive coding, P being a natural non-null integer, the motion vector fields being calculated for these pictures, consisting in calculating the rate of use of an entity (i, j) of a picture of the group according to the rate of use of the entity of the previous, respectively following, picture, origin of the motion vector whose extremity is assigned to the entity (i, j) of the said picture of the group.

The rate of use of an entity of a previous, respectively following, picture, can be temporally weighted to give less importance to the pictures furthest from the calculated picture k.

According to a particular implementation, the coding mode of an entity of the picture such as inter mode, intra mode, is selected according to its rate of use.

According to a particular implementation, a coding parameter of an entity of the picture such as quantizing step, picture block size, bit-rate-distortion criteria, number of AC coefficients coded, weighting matrix, is calculated according to its rate of use.

According to a particular implementation, a picture entity being a picture block, the entity motion estimation is realized in a picture sampling step in such a manner that a pixel of the sampled picture corresponds to an image entity, then in a motion estimation at the level of the pixel, on the picture sampled.

According to a particular implementation, a picture entity is a pixel and the coding of the picture depends on the average value of the rates assigned to the pixels of the picture.

According to a particular implementation, a calculation of a rate of use of a picture of the sequence is obtained according to the rates of use assigned to the entities of the said picture and a selection of a reference picture in the sequence of video pictures for a forward predictive coding of a previous picture or a backward predictive coding of a following picture, from this reference picture, is carried out according to the potential rates of use calculated for the pictures of the sequence.

The invention also relates to a method for organizing a GOP implementing the aforementioned method for calculating the rate of use of the pictures of the sequence, characterized in that it comprises the following steps:
- definition of 3 picture classes depending on whether the future rate of use is noticeably greater, in the same order as or noticeably lower than the past rate of use,
- classification of the pictures of the GOP,
- determination of ranges of pictures constituted by a predefined minimum number of successive pictures of the same class,
- classification of the ranges according to these picture classes,
- organization of the GOP by imposing reference pictures of type P at the extremities of the determined ranges.

According to a particular implementation, additional reference pictures of type P are placed within the ranges surrounded by reference images of type P when these ranges have a length greater than a predefined value. The coding mode of the pictures can depend upon the range to which they belong.

The analysis of the dynamic behaviour of the different entities of the picture, namely the analysis of the motion over several successive pictures, enables each picture entity or each picture to be evaluated for the degree of potential use as a prediction.

At a controlled bit-rate, the recovery quality of the pictures is increased, at a non-controlled bit-rate, that is with a fixed value of the quantizing step of the DCT coefficients, the coding cost is lower.

An improvement of the coding performances, particularly in relation to the psycho-visual yield, is obtained. The video compression is optimized by limiting the coding cost of the parts of the picture that will disappear more or less rapidly and by improving the quality of the coding of the other entities of the picture for which the lifetime is greater. Hence, the temporal prediction of the following pictures to be coded, which will use these entities as reference, will itself be of a higher quality.

The video compression is optimised by determining the structure of a GOP in an adaptive manner according to the content of the video sequence, by judiciously choosing the reference images to ensure a good level of prediction of the other pictures. The improvement in the quality of the pictures is particularly visible in scenes containing effects such as zoom-in and zoom-out. For the zoom-out effect, the choice of a following picture as reference picture is given priority, for the zoom-in effect, it is a previous picture that is given priority in the choice of the reference picture.

Figure 2:
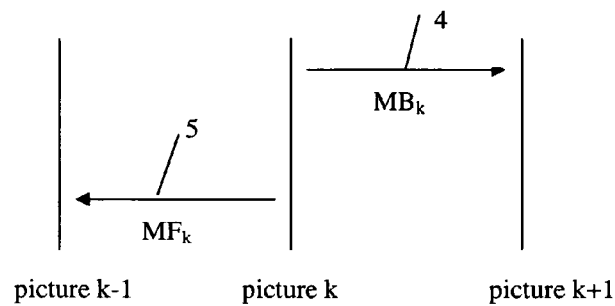
Figure 3:
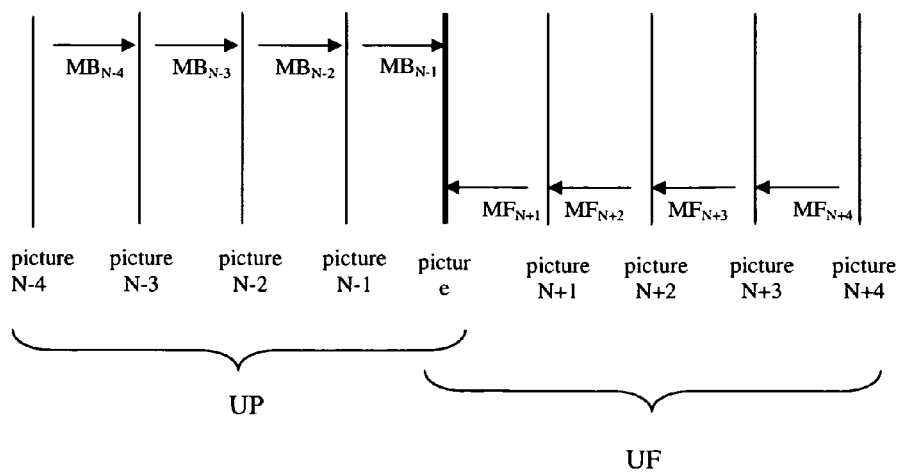
Figure 4:
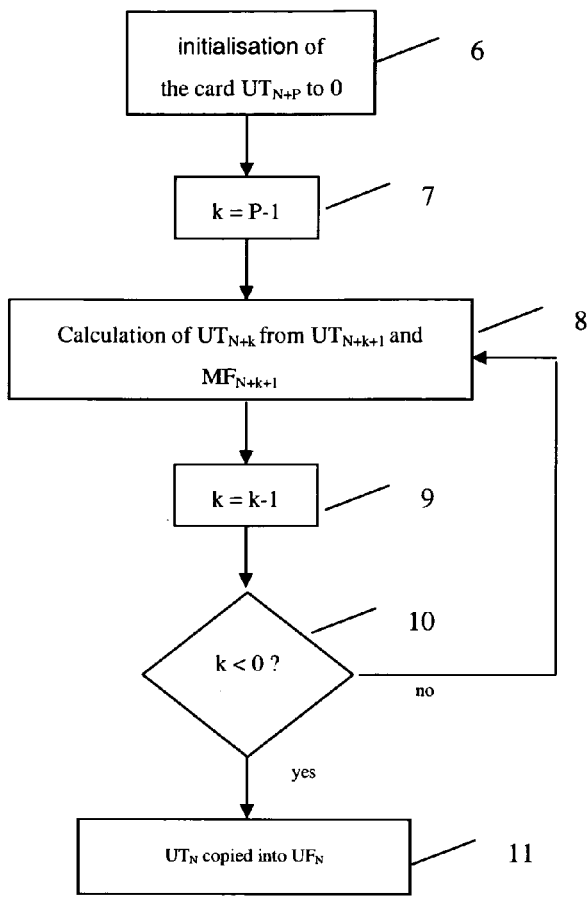
Figure 5:
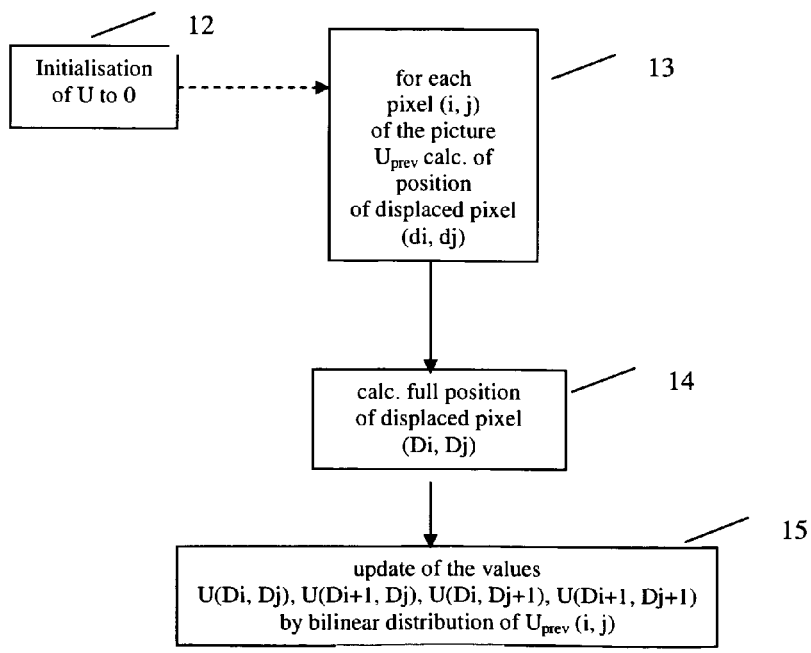
Figure 6:
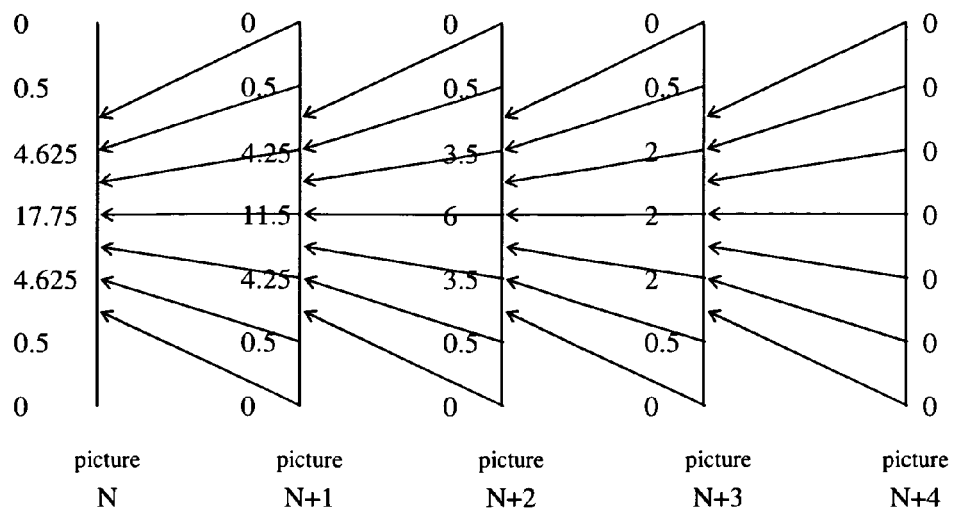
Figure 7:
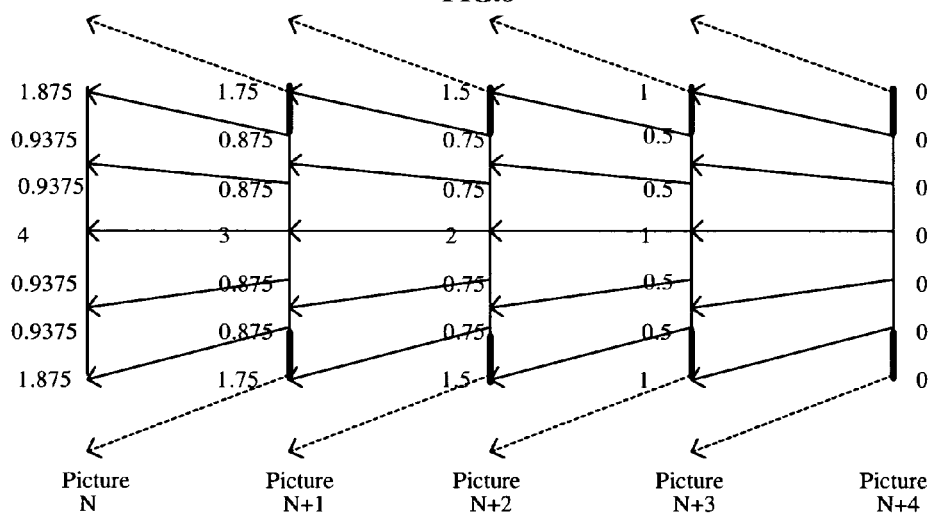
Figure 8:
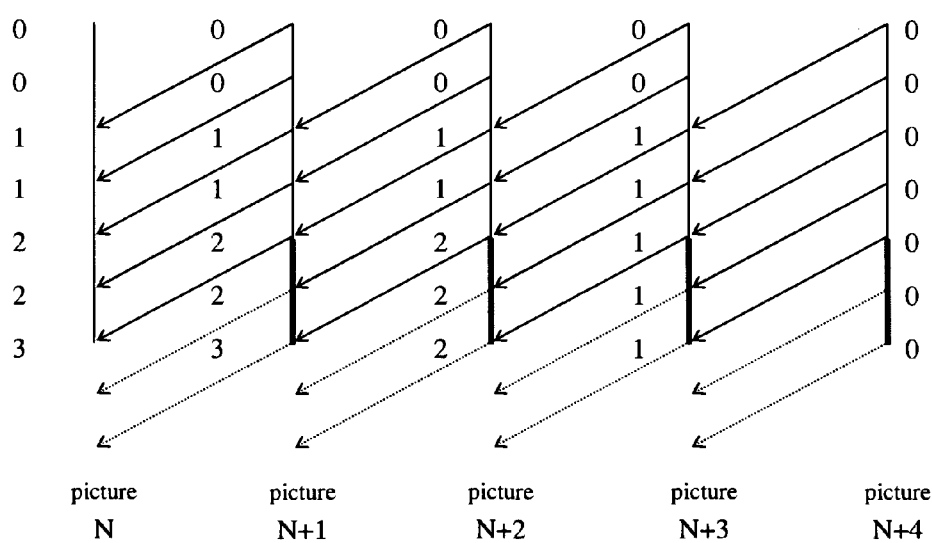
Figure 9:
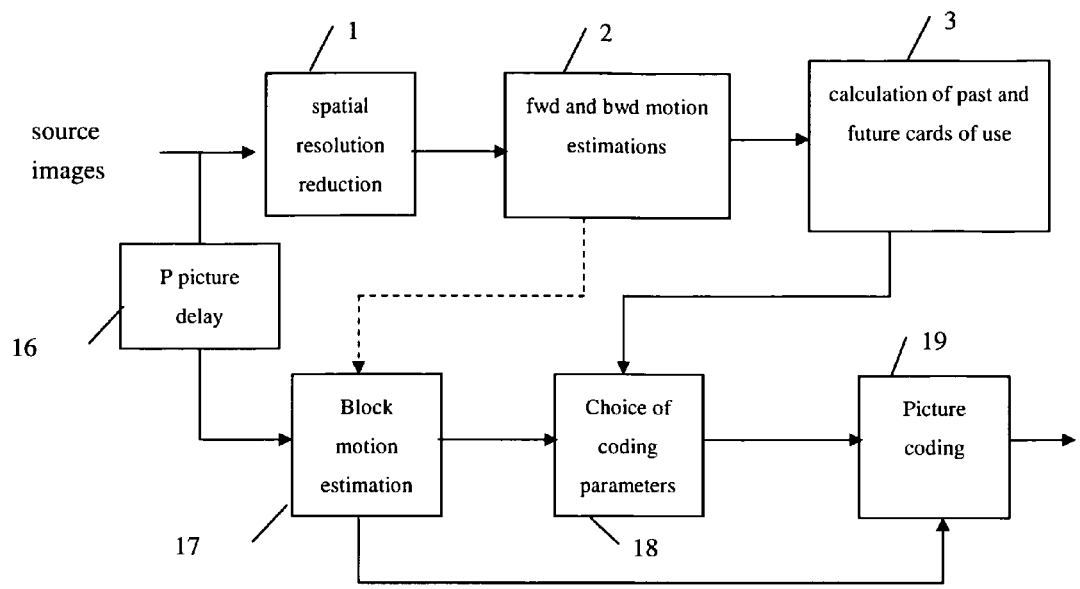
Figure 10:
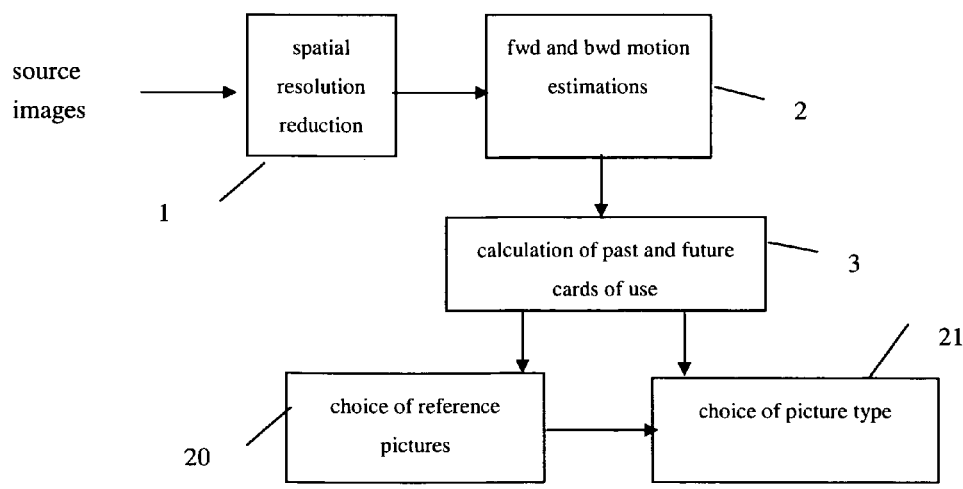
Figure 11:
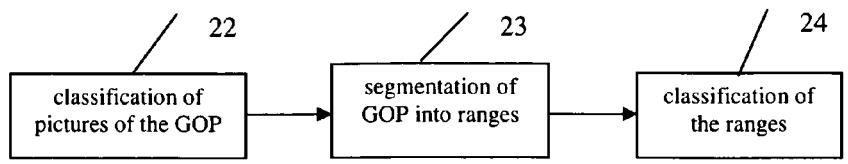
Figure 12:
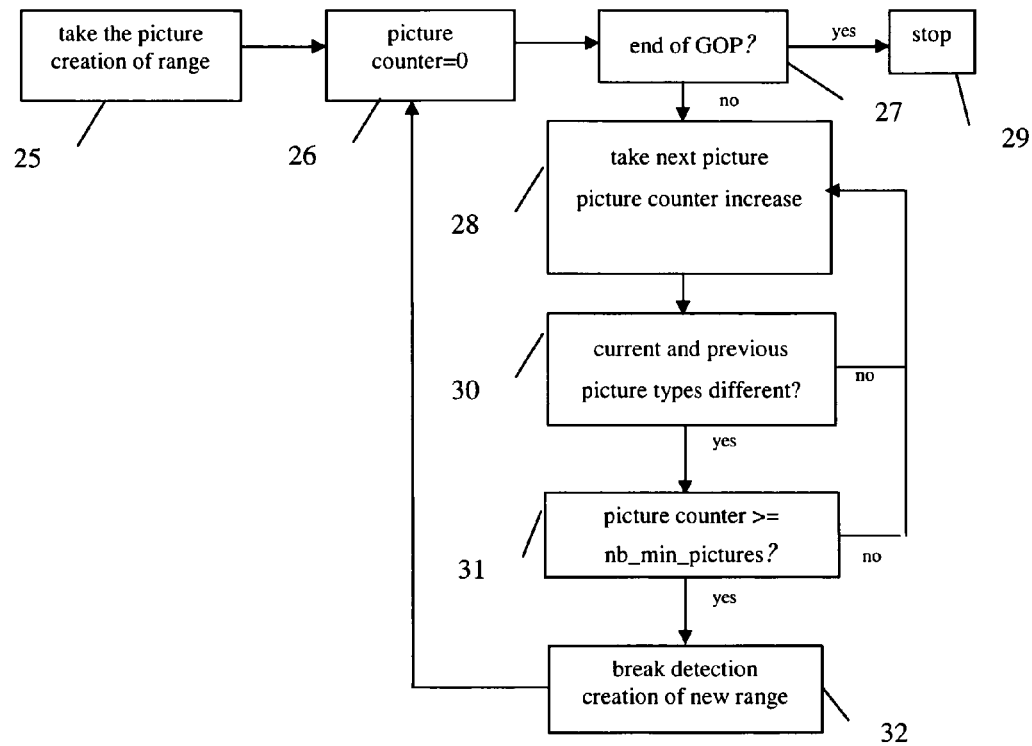
Figure 17:
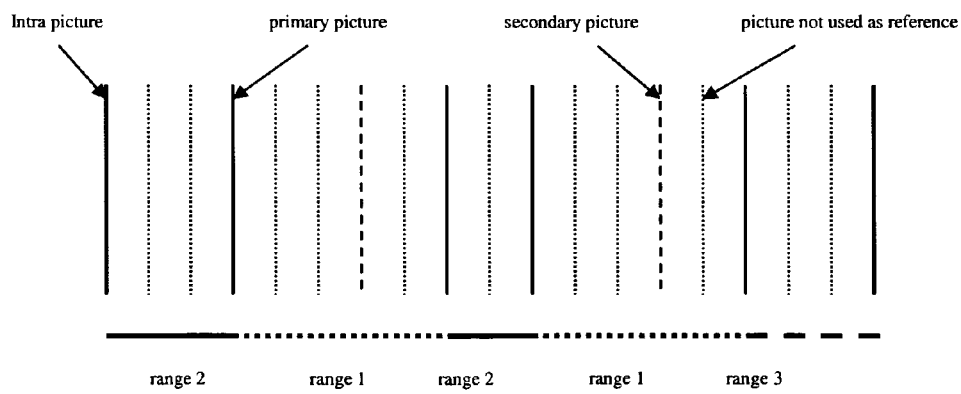
Figure 13:
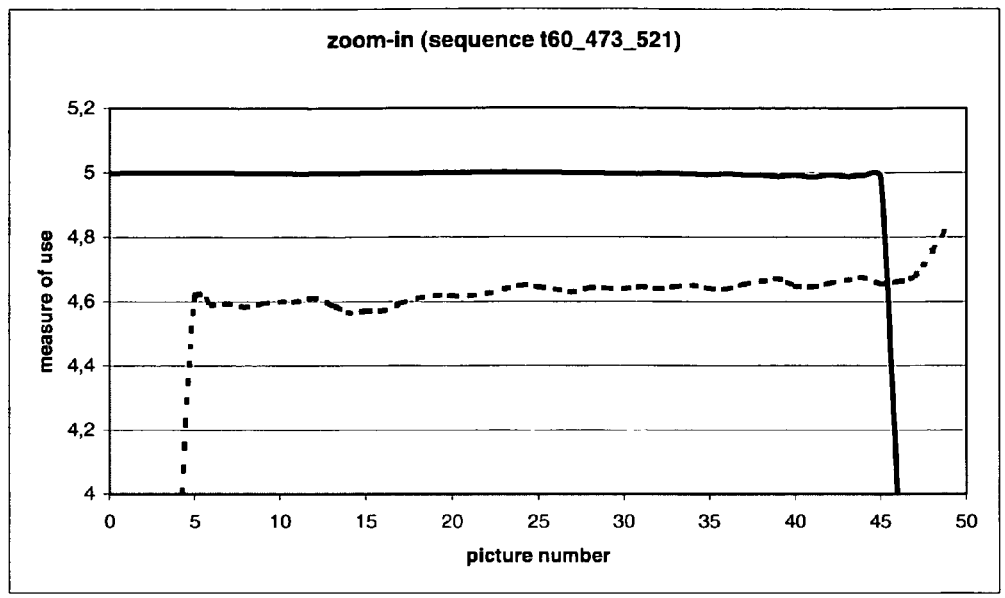
Figure 14:
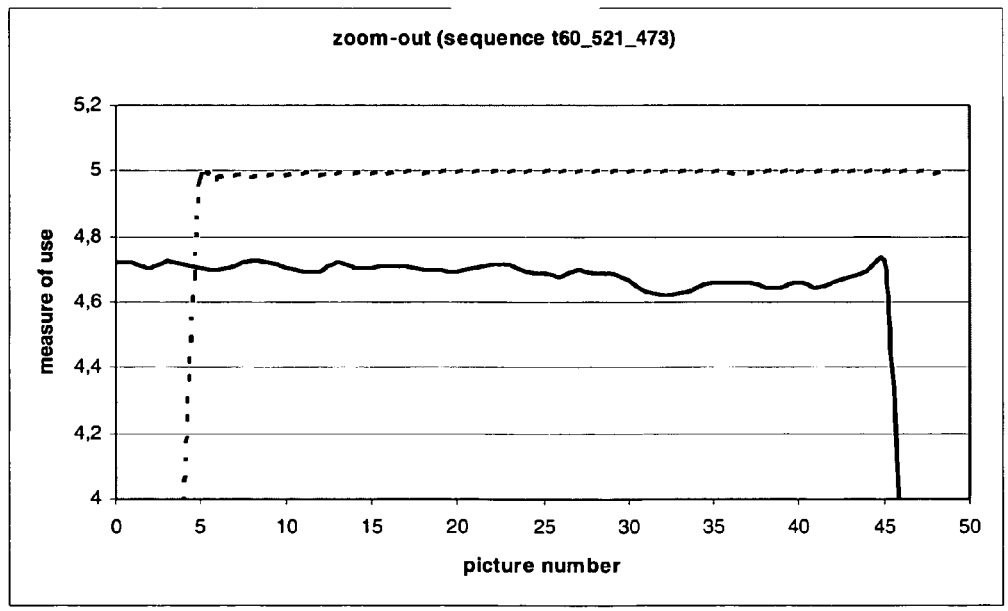
Figure 15:
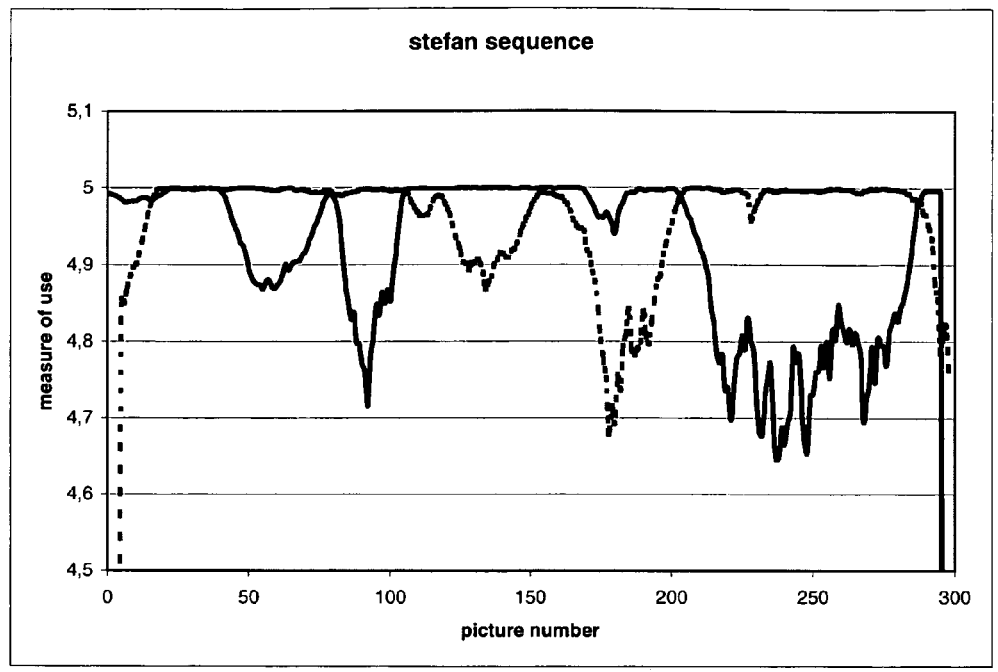
Figure 16:
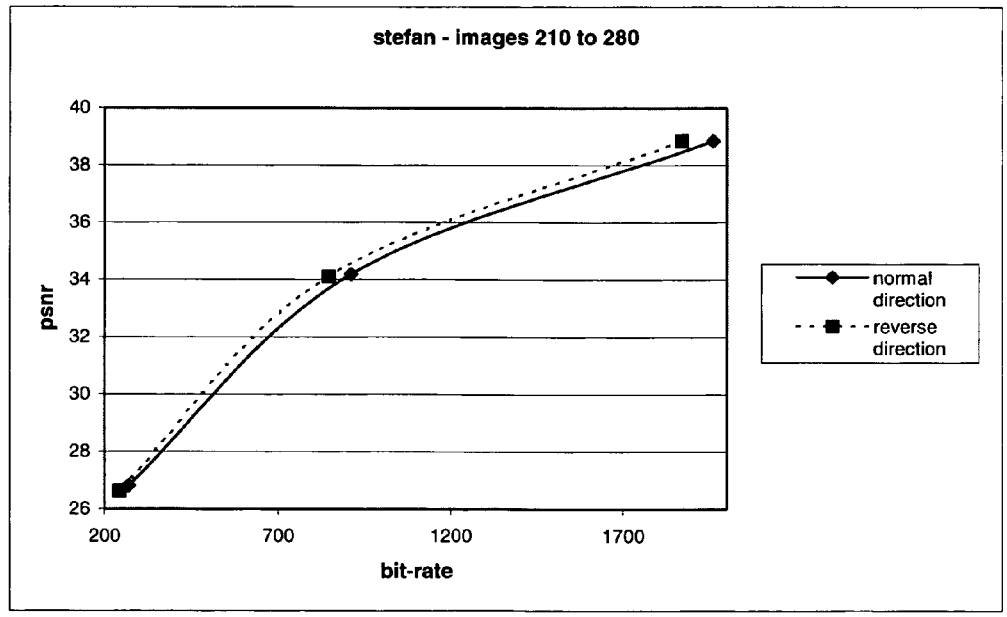

Other specific features and advantages will emerge clearly from the following description, the description provided as a non-restrictive example and referring to the annexed drawings wherein:

FIG. 1, a simplified diagram of the method of calculating cards of use,

FIG. 2, a "backward" and "forward" motion field,

FIG. 3, the fields used for the cards UP and UF,

FIG. 4, a flow chart for calculating $FU_N$ and $PU_N$,

FIG. 5, a flow chart for calculating a temporary U card,

FIG. 6, an illustration of $FU_N$ for zoom-in effects,

FIG. 7, an illustration of $FU_N$ for zoom-out effects,

FIG. 8, an illustration of $FU_N$ for translation effects,

FIG. 9, a simplified diagram of the coding method of a picture,

FIG. 10, a simplified diagram of the selection method of a reference picture, FIG. 11, a flow chart for classifying the GOP ranges, FIG. 12, an algorithm for segmenting the GOP into ranges, FIG. 13, the variation curves of $\overline{UP_N}$ and $\overline{UF_N}$ for a zoom-in effect, FIG. 14, the variation curves of $\overline{UP_N}$ and $\overline{UF_N}$ for a zoom-out effect, FIG. 15, the variation curves of $\overline{UP_N}$ and $\overline{UF_N}$ for a "stephan" sequence, FIG. 16, the bit-rate-distortion curves for an extract of the "stephan" sequence, FIG. 17, an example of distribution of the reference pictures.

FIG. 1 shows a simplified structure of the calculation method of cards of use.

The source pictures of a video sequence are sent to a first reduction step of the spatial resolution, marked 1 in the diagram. This step is followed by a step 2 of forward and backward motion estimation that will also be called "forward" and "backward" motion hereafter to use the terms of the most commonly used MPEG standard. The next step 3 realises a calculation of past and future cards of use.

The reduction of the spatial resolution is used to reduce the size of the successive pictures on which the analysis is conducted so as to lower the calculation costs. If one considers an MPEG-4 part 10 context, the minimum size of the blocks is 4×4 pixels. It therefore appears to be relevant to reduce the resolution by a factor of 4 in height and width, one pixel of the reduced picture corresponding to one block of the picture in full resolution.

Step 2 realizes, for each reduced picture $I_k$, an estimation of a dense forward motion field $MF_k$ of $I_k$ to its previous picture $I_{k-1}$, and of a backward motion field $MB_k$ of $I_k$ to its following picture $I_{k+1}$. The vector fields $MF_k$ and $MB_k$ are the vector fields associated with a picture $I_k$. A motion vector of one of these fields associated with the picture $I_k$ has its origin corresponding to a pixel of this image $I_k$, a pixel to which it is assigned.

FIG. 2 diagrammatically shows the backward $MB_k$ referenced 4 and forward $MF_k$ referenced 5 motion fields of a picture k. The motion estimation can be carried out by any type of estimator, an estimator of the pel-recursive type is perfectly suitable.

Step 3 calculates the cards of potential use. For each reduced picture N, the evaluation of cards $UF_N$ and $UP_N$ characterising its past and future potential use from successive forward and backward motion fields is carried out. This calculation is performed from the 2P vector fields calculated for the reduced pictures N–P to N+P. A delay of at least P pictures is therefore necessary for this operation.

For example where P=1, for a picture N=k–1, the forward vector field $MF_k$ associated with the picture k enables, according to the positions of the extremities of the motion vectors in the picture k–1, whose origin is a pixel of the picture k, a probability of use of the pixels of the picture k–1 to be defined. This involves the probability of use of the pixels of the picture k–1, generally their luminance value, by the motion vectors, to define the picture k by forward motion estimation. Likewise, for a picture N=k+1, the backward vector field MBk associated with the picture k, can define a probability of use of the pixels of the picture k+1 to define the picture k by backward motion estimation.

An analysis is therefore carried out with the aim of assessing the potential degree of use of each entity or each picture as a prediction or temporal reference, from the previously calculated motion fields. For a picture N, two cards or pictures are calculated, $UF_N$ indicating for each 4×4 block of the picture N its potential level of use for the future pictures, and $UP_N$ indicating for each 4×4 block of the picture N its potential level of use for the past pictures. In each pixel (i, j) of the picture $UF_N$, the value $UF_N(i, j)$ indicates the potential use of this pixel for the future pictures. Likewise, in each pixel (i, j) of the picture $UP_N$, the value $UP_N(i, j)$ indicates the potential use of this pixel for the past pictures.

By taking the example of the block coding of the picture k, the calculation of the rate of potential use of a block of this picture k uses either the backward motion vector field of a picture k−s, corresponding to a motion estimation of the blocks of the picture k−s to a following picture k, or the calculation of a forward motion vector field of a picture k+p, corresponding to a motion estimation of the blocks of the picture k+p to a previous picture k. As s and p are non-null natural integers, it can also use both vector fields.

This rate is calculated for a backward predictive coding of the picture k, according to the number of vectors of the backward motion vector field of the picture k−s pointing to the block of the picture k or for a forward predictive coding of the picture k+p, according to the number of vectors of the forward motion vector field of the picture k+p pointing to the block of the picture k. It can also be calculated for a backward and forward predictive coding, being then a combination of the two previous rates. The coding of the picture block or the picture comprising this block depends on the rate of use calculated.

Calculation of the Card $UF_N$ and the Card $UP_N$

The calculation of the card $UF_N$ characterizing the future potential use in relation to the picture N is based on the forward motion fields $MF_{N+1}$, $MF_{N+2}$, ..., $MF_{N+P}$. FIG. 3 shows the fields used for the cards UP and UF where P=4.

The calculation flow chart of the card $UF_N$ is described in FIG. 4.

The method is recursive. The first step referenced 6 initialises a temporary card $UT_{N+P}$ by a picture whose value attributed to each pixel is 0. The second step 7 initialises a variable k with the value P−1. Step 8 calculates a temporary card $UT_{N+k}$ by using $UT_{N+k+1}$ and $MF_{N+k+1}$. The next step 9 decrements the value k and step 10 checks whether k is negative. In the negative, the next step is step 8 and so on until the $UT_N$ is calculated from $UT_{N+1}$ and $MF_{N+1}$. Indeed, when k is found to be negative in step 10, the following step is step 11, which recovers the card $UT_N$. This card $UT_N$ thus corresponds to the final card that one wants to calculate $UF_N$.

The calculation of the card $UP_N$ characterizing the past potential use of the picture N is based on the backward motion fields $MB_{N-1}$, $MB_{N-2}$, ..., $MB_{N-P}$. The method is similar to the one described for the card $UF_N$. A temporary card $UT_{N-P}$ is initialised by a picture for which the value is 0 in each pixel. Then a temporary card $UT_{N-P+1}$ is deduced by using $UT_{N-P}$ and $MB_{N-P}$, then a card $UT_{N-P+2}$ by using $UT_{N-P+1}$ and $MB_{N-P+1}$ an so on until the card $UT_N$ by using $UT_{N-1}$ and $MB_{N-1}$. The card $UT_N$ thus corresponds to the final card that is required to be calculated $UP_N$.

Step 8 is described in more detail in FIG. 5. This figure shows a flow chart for the calculation of a card U from a previously calculated card $U_{prev}$ and a motion field M. This is the calculation of a temporary card $UT_{N+k}$ from a previously calculated temporary card $UT_{N+k+1}$ and a motion field $MF_{N+k+1}$ for a card $UF_N$ and the calculation of a temporary card $UT_{N-k}$ from a previously calculated temporary card $UT_{N-k-1}$, and a motion field $MB_{N-k-1}$ for a card $UP_N$.

The step referenced 12 recalls that the value of each of the points of the picture or card U is set to 0, for the first temporary picture $UT_{N+P}$ or $UT_{N-P}$, according to whether one calculates $UF_N$ or $UP_N$, step 6 of the previous algorithm. Step 13 determines, for each pixel (i, j) of the picture $U_{prec}$, which is either the card set to 0 during the first iteration, or the card calculated in the previous iteration, its position (di, dj) after motion compensation by its motion vector M(i, j) of components mi(i, j) and mj(i, j). i and j are the line and column numbers in the picture.

$$\begin{cases} di = i + mi(i, j) \\ dj = j + mj(i, j) \end{cases}$$

The next step 14 calculates the full position of the displaced pixel. If (di, dj) is in the image, one considers the pixel with coordinates (Di, Dj), where Di is the integer part of di and Dj the integer part of dj as well as the residual values ri=di−Di, rj=dj−Dj.

The next step 15 updates the values or rates of use for the pixels (Di, Dj), (Di, Dj+1), (Di+1, Dj), (Di+1, Dj+1) of the current card, according to the value of use $U_{prev}(i, j)$ assigned to the pixel (i, j) of the previous card $U_{prev}$ and the position of this pixel in the current card after the displacement corresponding to the motion vector assigned to this pixel (i, j).

Using a bilinear type weighting based on the residual values of the motion vector, the value U is updated according to the following rules:

$U(Di,Dj)=U(Di,Dj)+(1-ri)\cdot(1-rj)\cdot(\alpha\cdot U_{prev}(i,j)+1)$ $U(Di,Dj+1)=U(Di,Dj+1)+(1-ri)\cdot(rj)\cdot(\alpha\cdot U_{prev}(i,j)+1)$ $U(Di+1,Dj)=U(Di+1,Dj)+(ri)\cdot(1-rj)\cdot(\alpha\cdot U_{prev}(i,j)+1)$ $U(Di+1,Dj+1)=U(Di+1,Dj+1)+(ri)\cdot(rj)\cdot(\alpha\cdot U_{prev}(i,j)+1)$ where $0<\alpha\leq 1$.

Hence, for a motion vector pointing to a coordinate position di, dj, the four pixels of coordinates (Di, Dj), (Di, Dj+1), (Di+1, Dj), (Di+1, Dj+1) surrounding this position, are processed. The highest value is assigned to the pixel D closest to the place to which the motion vector points. If, for example, the vector points to (Di, Dj), ri and rj are null and only the value U(Di, Dj) is increased.

The parameter $\alpha$ can gradually reduce the influence of the oldest cards of use in the iterative calculation method of the card of use described in the flow charts of FIGS. 4 and 5. It can be calculated from a measure of confidence in the estimation of the motion vector field, this level of confidence can be for example calculated by the motion estimator.

Here, this naturally involves examples of calculations, the spatial and temporal weightings can be carried out in different ways.

For example, let us take the calculation of the card $UF_N$. By applying these formulas, the contribution of $UT_{N+1}$ to the card $UT_N$ is weighted by a factor $\alpha$, that of $UT_{N+2}$ by a factor $\alpha^2$, that of $UT_{N+3}$ by a factor $\alpha^3$, ... that of $UT_{N+P}$ by a factor $\alpha^P$.

An improvement of the invention consists in weighting the calculated rate of use values according to the complexity of the picture blocks. When calculating the values $UP_N$ and $UF_N$ associated with a given picture N, it is indeed interesting to take into account the complexity of the blocks of this picture. Consider two blocks of the picture, one having a very rich texture and the second a uniform texture. Let us assume moreover that these two blocks of the picture have identical values of use. In terms of coding, it is the block with very rich texture that is really important for temporal prediction. Hence, for a calculation of the rates of use at the level of the picture, it appears to be relevant to determine $\overline{UP_N}$ and $\overline{UF_N}$ as averages weighted by the complexity of the blocks of the cards $UP_N$ and $UF_N$. For example, the variance of the texture of the blocks can be taken into account to obtain a weighted average:

$$\overline{UP_N} = \sum_{b \in I} UP_N(b) * \sigma^2(b)$$

$$\overline{UF_N} = \sum_{b \in I} UF_N(b) * \sigma^2(b)$$

where b designates a block of the picture I.

FIGS. 6 to 8 illustrate the method for calculating the card UF in different motion configurations, FIG. 6 during a zoom-in effect, FIG. 7 during a zoom-out effect and FIG. 8 during a translation effect, for the single dimension case in which α=1 and P=4.

The picture zones with thick lines shown in FIGS. 7 and 8 correspond to the parts of the picture that are difficult to predict as they are located outside the reference picture N. These zones feature dotted line vectors that point outside the picture, calculated from a motion estimator that can model the motion field into an overall motion field (zoom, translation, etc.).

To give a calculation example, consider the picture N+2 of FIG. 6. The value 3.5 attributed to a pixel of the picture is obtained in the following manner. A motion vector coming from a pixel assigned with the value 0.5 of the picture N+3 gives a value (1+0.5)=1.5. A motion vector coming from a pixel assigned with the value 0 of the picture N+3 gives the value (1+0)·0.5. The value 0.5 comes from the fact that the motion vector does not point to the pixel of the picture N+2 but between two pixels of this picture. Likewise, a motion vector coming from a pixel assigned with the value 2 of the picture N+3 gives the value (1+2)·0.5. That is, a total of 1.5+0.5+1.5=3.5.

In the example of FIG. 7, for a zoom-out effect, the outer part cannot be predicted for forward prediction because this part systematically contains new information, while at the same time the central part of the picture reduces its definition. If one considers the same sequence in backward prediction, then each of the pictures taken in the reverse direction enables the following picture to be predicted entirely, still in the reverse direction. This is also the case for zoom-in with forward prediction, example of FIG. 6.

In fact, any new zone to code generally uses the intra coding, which always has a high cost. In the present case of zoom-out, the simple fact of coding this sequence in reverse in P pictures, with the backward prediction implicitly, enables the cost of coding comparative to the coding in the initial direction to be reduced.

A simulation in MPEG-4 part 2 coding in P pictures where M=3 can illustrate this phenomenon for a zoom-out effect. These results basically concern the P type pictures:

| | bit-rate | Psnr |
|---|---|---|
| Normal order coding | 506.8 Kb/s | 33.29 dB |
| Reverse order coding | 447.8 Kb/s | 33.17 dB |
| Gain | −11.6% | −0.12 dB |

The case of two objects initially outside of the picture, each one then appearing on one side of the picture, crossing each other and finally exiting on the other side, is also a classic example. In this case, the most relevant pictures, namely the pictures that have the most chance of being used as temporal reference, are the pictures in which the two objects are the most visible.

It is therefore noted that it is judicious to choose the reference pictures and the forward or backward prediction type. The tools offered by the MPEG4 part 10 standard enable this choice. It is also judicious, during the coding of a picture, to give priority to the picture entities used for the prediction of the entities of a following or previous picture to be encoded.

In the examples, the rate of potential use is calculated for each block or macroblock of the picture. It is naturally just as conceivable, without leaving the scope of the invention, to calculate the card of use for any entity of the picture, for example a pixel of the picture, an object of the picture or VOP (Video Object Plane) constituted by a group of pixels.

Likewise, the calculations are described for a complete picture. The entities relating to the picture are picture blocks of size 4×4 and the calculation motion vector fields, by simplification, are the ones relating to these entities. It may also just as well involve the pixels of the original picture or sets of pixels constituting the objects of the picture in the case of object coding, and the calculated motion vector fields could be the dense fields of this picture or those relating to the objects. In fact, the entities relative to the vectors of the motion vector fields used to calculate the cards of use can be different from the entities on which the coding is performed. Those skilled in the art are capable of assigning a motion vector or a rate of use to a portion of a picture on which the coding is carried out from a motion vector field of the picture, for example by averaging or by interpolation.

A first application of the calculation of cards of use relates to the coding itself of the pictures, namely the calculation of coding parameters and the selection of coding modes. FIG. 9 completes the method of FIG. 1 for the calculation of coding parameters and selection of coding modes. The references of FIG. 1 are used for the common elements. The coded entities are, in the example, picture blocks.

An analysis of the motion is carried out on several successive pictures, it involves steps 1, 2 and 3, with a lead of P pictures on the coding itself of the pictures. This analysis can characterize the future positions of the entities of the current picture to be coded.

A step 16 delays the source pictures, those sent to the steps 1, 2 and 3, of P pictures before sending them to steps 17, 18, 19 to be coded. The picture coding consists in a motion estimation per block, step 17, from the delayed source pictures, possibly taking into account the motion information coming from step 2. The calculation of the criteria of choice of the coding mode and/or the calculation of the associated coding parameters, step 18, is carried out according to information coming from the calculation step of the cards of use 3 and of the block motion estimation step 17. The result of this calculation is sent to the picture coding step 19, that also receives the motion estimation information of step 17.

The cards of use enable, for each block, to obtain its level of potential use for the future and/or the past.

The coding mode selected and the coding parameters used depend on the type of image to be coded.

If this is a picture of the predictive type or P type, the card of use used is the card of use for the future. If this is a picture of the bi-directional or B type, serving as a reference for the coding of other pictures, which is allowed by the MPEG-4 part 10 standard, the card of use used is for example the average of the cards of use for the future and for the past. The principle is to ensure a greater quality of coding for the blocks for which the rate of potential use is high.

The coding mode is for example the coding type, inter or intra, the size of the blocks in the macroblock on which is carried out the coding and to which the motion vectors are assigned, the parameters are for example the direction of prediction in inter mode in the intra, the reference picture chosen, the quantizing step, the weighting matrix, etc. These different modes and coding parameters are described in the standards, among others the standards MPEG 2, MPEG4 part 2, MPEG4 part 10, H263, for example the paragraph 9.2.1.5 of the document ISO/IEC 14496-10 :2002 for the MPEG4 part 10 standard.

For example, different coding modes possible described in the standard MPEG 4 are listed below for a P type picture:

| Modes | Parameters |
| --- | --- |
| Intra16×16 | Intra prediction direction (inter coding in the intra) |
| Intra4×4 | Intra prediction direction (inter coding in the intra) |
| Inter16×16 | 1 motion vector + its reference picture number (optional) |
| Inter16×8 | 2 motion vectors + their reference picture number (optional) |
| Inter8×16 | 2 motion vectors + their reference picture number (optional) |
| Inter8×8 | 4 to 16 motion vectors + their reference picture number (optional) (see table below) |
| Skip | |

The values after the intra or inter terms correspond to the size of the blocks constituting the macroblock, the number of the reference picture indicates the picture to which the motion vector refers.

For the Inter8×8 mode, the macroblock is cut into four 8×8 blocks and each of these 8×8 blocks can be coded according to the following modes, which gives a maximum of 16 motion vectors for the macroblock:

| | |
| --- | --- |
| Inter8×8 | 1 motion vector + its reference picture number (optional) |
| Inter8×4 | 2 motion vectors + their reference picture number (optional) |
| Inter4×8 | 2 motion vectors + their reference picture number (optional) |
| Inter4×4 | 4 motion vectors + their reference picture number (optional) |

The block 17 realizes a motion estimation of the classic type, for example by block matching in order to operate the temporal redundancy of the pictures during the coding. It supplies motion vectors, by blocks or macroblocks, relating to the reference pictures on which the correlation is carried out. These motion vectors are sent to step 19 to be coded before their transmission, with the other video digital data, to a decoder or a storage device. They are also sent to step 18 which calculates the coding parameters and the mode choice criteria. This coding information is sent to step 19, which carries out the coding itself of the picture and which supplies the coded digital video data. The coding is for example an MPEG type coding exploiting the temporal and spatial correlation, with calculation of the discrete cosine transform applied to the blocks of the image or to the blocks of residues obtained by difference of the current block with a reconstructed block of a reference picture.

The card $U_N$ calculated in step 3 is then used to choose the coding mode and calculate the coding parameters, step 18. Examples are provided below.

An important coding parameter is the quantizing step of a block of the picture. The quality of a picture is all the better as the quantizing step is low. This quantizing step is normally calculated by a control module for the full image, this step being next refined for each macroblock according to certain criteria for example related to the perception of picture faults by the spectator, such as the motion. A new criteria is proposed, which can be proprietary, for weighting the value of the quantizing step applied to a macroblock. This weighting is carried out according to the UN(i, j) values of the 4×4 blocks of this macroblock. The value of the quantizing step is thus reduced for high coefficients of use and inversely. The values of the weighting card for the picture, coding parameters calculated in step 18, are sent to step 19 which exploits them for the calculation of the quantizing steps of the blocks.

Another example consists of modifying the quantizing step calculated for the complete picture. The average value $\overline{U_N}$ of the card $U_N$ is then calculated during step 18. This coding parameter, which is the weighting value of the quantizing step for the picture, is used by the bit-rate control module during the coding of the picture. This latter supplies a quantizing step depending on this average value. It is in fact preferable to accord a good quality to important pictures, that is serving as reference in a prolonged manner. Consequently, more bit-rate is granted to the N pictures having high $\overline{U_N}$ values.

Another example consists of modifying a bit-rate-distortion criteria for the selection of the coding mode. The selection of a coding mode of a macroblock, according to the prior art, can be carried out according to the distortion D and the coding cost C of the macroblock. The principle is to minimise this criteria, but by giving greater importance to the distortion parameter than to the cost parameter, during the choice of the mode, when the rate of use is greater, in such a manner as to favour the coding mode giving a low distortion. For example, the following distortion-bit-rate criterion can be used:

$$E_{mb}(\text{mode}) = f_{mb}(U_N(b)) \cdot D(\text{mode}, \text{param}(\text{mode})) + \lambda \cdot C(\text{mode}, \text{param}(\text{mode}))$$

mb designates the macroblock treated,

D represents the function measuring the distortion. For example, this is the sum of the absolute value of the difference between the reconstructed signal and the source signal, C represents the cost function of the coded data, $U_N(b)$ is the rate of use allocated to a block b of the macroblock mb, param(mode) designates the parameters associated with the mode tested, for example the motion vectors of each 8×8 block if the mode corresponds to an inter coding with a vector per 8×8 block.

mode designates the tested mode.

$f_{mb}(\ )$ is a weighting function of the distortion, which can take the following form for example:

$$f_{mb}(U_N(b)) = \begin{cases} 1 & \text{if } \exists\, b \subset mb,\ U_N(b) > S, \text{ otherwise} \\ \mu + \dfrac{1-\mu}{S} \cdot \max_{b \subset mb}(U_N(b)) & \end{cases}$$

$\mu$ being a predetermined parameter between 0 and 1 and b designating a block of the tested macroblock mb and S a predetermined threshold.

The function f thus varies from the value μ if $U_N$ equals zero for all the blocks of the macroblock up to the value 1 if $U_N$ is greater than or equal to S for at least one of the blocks of the macroblock.

Hence, for a macroblock for which the blocks all have a low rate of use $U_N$, the weighting function f has a low value. The cost function then becomes essential and the choice is oriented towards the coding mode having the lowest cost. On the contrary, if all the blocks have a high rate of use $U_N$, the weighting function f is close to unity and one finds the classic formula of bit-rate-distortion choice used for example in the MPEG-4 part 10 reference software.

A fourth example of calculation of coding parameters is the gradual forcing to 0 of the AC coefficients of the blocks for which $U_N(i, j)$ is less than a predetermined threshold. The AC coefficients are forced to zero gradually, that is by starting from the coefficients relative to the highest frequencies, for example in the reverse direction of the zigzag sweeping direction, and the number concerned depends on the value of the rate of use. Step 18 calculates a binary value matrix, the AC coefficients being multiplied by the coefficients of this matrix, for which the number zero, starting from the location corresponding to the higher frequency AC coefficients, depends on the rate of use of the block.

It is also possible to calculate the weighting matrices of the block coefficients according to the rate of use. These matrices can themselves weight the coefficients of the weighting matrices defined in the MPEG standards, and these matrices account for the frequency of the coefficients and of the coding type of the blocks.

The analysis enabling the cards of use to be obtained can therefore be conducted in the direct temporal direction and in the reverse temporal direction, that is toward the past. This is relevant in the case of MPEG-4 part 10 in which the pictures serving as references can be organised in any temporal order.

The procedure for processing a picture is then as follows:

At the time of coding the picture N, the motion fields $M_{N+P-1}, \ldots, M_{N+1}, M_N$ are available. The coding of the picture N involves the following steps:

reduction of the picture N+P and dense motion estimation $M_{N+P}$ between the reduced images N+P and N+P−1;

calculation of the card $U_N$ from the motion fields $M_{N+P}$, $M_{N+P-1}, M_{N+1}$;

coding of the picture N by using $M_N$ and $U_N$ as input.

For the image 0, it is necessary to proceed with the estimation of the motion fields $M_{P-1}, \ldots, M_1$ beforehand.

A second application of this calculation of cards of use relates to the selection of reference pictures of a sequence of video pictures for a future predictive coding of a previous picture or a backward predictive coding of a following picture, from this reference picture. It can more particularly involve an adaptive structuring method for a GOP or group of pictures.

FIG. 10 completes the method of FIG. 1 for the selection of reference pictures. The references of FIG. 1 are taken for common elements. The cards of use calculated in step 3 are sent to a step 20 that chooses the reference pictures and to a step 21 that receives in parallel the information from step 20, to choose the type of the pictures.

The segmentation of the video is assumed to have been realised in a phase beforehand. The video sequence is analysed at the level of the video plane.

For each reduced picture N, step 20 determines its classification as a reference picture or a picture not used from the cards $UF_N$ and $UP_N$. The reference pictures are chosen as a priority when their cards have a noticeable difference with the cards of the previous and/or future pictures. For example, this involves the pictures surrounding a group of pictures having neighbouring cards. The types of pictures of a GOP, step 21, are defined as a function of the choice of these reference pictures and cards of use. These latter allow ranges to be defined in a GOP corresponding to successions of pictures of a same class, a class of pictures being itself defined from a difference between the past and future rate of use of a picture, as described at a later stage. These ranges then enable the types of coding of the pictures of the GOP to be defined.

The calculated cards $UF_N$ and $UP_N$ are used to structure the GOPs.

In our example, the frequency of the intra pictures is assumed to be fixed and predetermined and the group of pictures processed is constituted by pictures located between two successive intra pictures.

The cards $UF_N$ and $UP_N$ are used to determine the coding direction to be used for the pictures located between two intra pictures. Namely $\overline{UP_N}$ the average value of $UP_N$ on the picture, that is the average of the coefficients of use assigned to the pixels or blocks of the picture, and $\overline{UF_N}$ the average value of $UF_N$ on the picture. A position is taken up on an intra picture, the pictures that precede it have already been coded. The method consists of analysing the values of $\overline{UP_N}$ and $\overline{UF_N}$ between this picture and the next intra picture.

The pictures located between these two intra pictures are classed according to three types:

type 1 pictures: pictures for which $\overline{UF_N}$ is noticeably greater than $\overline{UP_N}$, type 2 pictures: pictures for which $\overline{UP_N}$ is noticeably greater than $\overline{UF_N}$, type 3 pictures: pictures for which $\overline{UP_N}$ and $\overline{UF_N}$ are of the same order.

Picture ranges are then determined among three types:

type 1 ranges: ranges containing a predefined minimum number of successive pictures of type 1.

They correspond to ranges in which the coding must be obtained with the normal temporal prediction, that is by pointing toward the past.

type 2 ranges: ranges containing a predefined minimum number of successive pictures of type 2.

They correspond to ranges in which the coding must be obtained with the reverse temporal prediction, that is by pointing toward the future.

type 3 ranges: the ranges containing only pictures of type 3 or having variations of the picture type not enabling these pictures to be assigned to a range of the first or second type.

They are coded with the normal temporal prediction.

The sequencing of the different operations enabling the ranges of a GOP to be determined is shown in FIG. 11.

A first step referenced 22 classifies the pictures of the GOP. The aim of this operation is therefore to determine the type of the GOP pictures. Quite simply, it consists of performing the following tests:

if $\overline{UF_N} > \overline{UP_N} + \lambda$ picture type=1 otherwise if $\overline{UP_N} > \overline{UF_N} + \lambda$ picture type=2 otherwise picture type=3

The value of λ can be chosen empirically, one example is a value close to 0.1.

A second step 23 segments the GOP into picture ranges, as shown above. The aim of this operation is to split the GOP into ranges according to the type of pictures that constitute the GOP.

After segmenting the GOP into ranges, a third step 24 classes the ranges of the GOP. The classification of the ranges is a very simple operation. If the range is constituted by pictures of the same type, the type of the range is the type of the pictures. Otherwise, the range is classed as type 3.

FIG. 12 shows the flow chart of a segmentation algorithm of the GOP into ranges implemented during the step 23.

A first step 25 initiates the algorithm by creating a first range comprising the first selected picture of the GOP. The next step 26 initialises a picture counter. Step 27 tests whether the picture processed corresponds to the end of the GOP. In the negative, the next step is the step 28 that takes into account the next picture that becomes the current picture and increases the picture counter.

If the type of the current picture is different from the type of the previous picture, test performed during step 30, a second test is performed at the next step 31 on the value of the picture counter. If this value is greater than or equal to a threshold called nb_min_pictures, then the next step is step 32 that detects the break in range and stores the pictures of the current range. The next step is the step 26 that initialises the picture counter.

If, at step 30, the type of current picture is the same as the type of the previous picture, the step 30 is looped back to the step 28.

If, at the step 31, the picture counter is lower than the threshold, then the step 31 is looped back to the step 28.

When the end of the GOP is detected in step 27, the processing of the GOP terminates, step 29.

The approach proposed consists therefore of detecting breaks in the type of the pictures. It is based on a threshold nb_min_pictures corresponding to the minimum size allowed for a range. With videos at 25 pictures/s, a value of 12, for this threshold, which corresponds to a half-second, appears to be reasonable. This number must naturally be lower than or equal to the size of the GOP. If the size of the last range created is lower than nb_min_pictures, it is integrated into the previous range.

The FIGS. 13, 14 and 15 give examples of variation of $\overline{UP_N}$, dotted line curve, and $\overline{UF_N}$, solid line curve, for the case of zoom-in, zoom-out and a "stephan" sequence.

FIG. 13 shows the curve of $\overline{UP_N}$ and $\overline{UF_N}$ for a zoom-in effect. The classification here gives a unique range of type 1 ($\overline{UF_N} \gg \overline{UP_N}$). The coding is in the normal direction.

FIG. 14 shows the curve of $\overline{UP_N}$ and $\overline{UF_N}$ for a zoom-out effect. The classification here gives a unique range of type 2 ($\overline{UP_N} \gg \overline{UF_N}$). The coding is in the reverse direction.

FIG. 15 shows the curve of $\overline{UP_N}$ and $\overline{UF_N}$ in a complex motion sequence comprising, alternatively or simultaneously, zoom-ins and -outs and sweeping motions. The different portions corresponding to the classification proposed can be seen fairly clearly on the curves. As an example, the portion of the pictures 210 to 280 can be classed as range 2.

For these different examples, the motion fields were calculated by a pel-recursive type motion estimator.

FIG. 16 shows the bit-rate-distortion curves by coding, with the reference MPEG4 part 10 coder (version JM2.0), this picture portion in the normal and reverse direction, namely forward prediction from past reference pictures and backward prediction from future reference pictures. The ordinate axis shows the peak signal to noise ratio (psnr) and the abscissa axis the bit-rate. The bottom curve corresponds to the extract of the "stephan" sequence coded in the normal temporal direction, the curve shifted upwards to a coding in the reverse direction. Indeed, it effectively proves that the reverse direction coding is preferable here.

All the pictures are not necessarily reference pictures. In any case, it appears relevant to place the reference pictures, that can be described a primary, at the ends of ranges identified beforehand. Additional reference pictures, that can be described as secondary, can then be inserted between the primary pictures, for example P pictures according to a default frequency. It remains to insert the pictures that will not serve as reference, and that will be predicted according to the range in which they are located in the normal direction, range 1, in the reverse direction, range 2, or in a bidirectional manner, range 3. FIG. 17 shows an example of distribution of the reference pictures according to this principle.

Naturally, the invention is not limited to the examples given. It is just as conceivable, during the selection of reference pictures, to use motion vector fields between the spaced pictures of a predetermined number of pictures. Likewise, the iterative method can be carried out between successive pictures or else between the spaced pictures of a predetermined number of pictures.

The rate of use of a pixel can be calculated according to the spatial distribution of the extremities of the motion vectors pointing in a predetermined geometric characteristic zone around this pixel. The spatial distribution can be defined according to the density of these motion vector extremities and/or the proximity of the processed pixel.

The motion estimation can be a hierarchical motion estimation by picture blocks, thus enabling the calculation to be limited to an average resolution giving a good estimation of the motion vector field. The motion information for this hierarchical level corresponding to the resolution declared as sufficient can then be used by the used blocks motion estimator for coding the picture.

Both applications were described independently from each other. A variant of the invention consists in combining these two applications. A first phase consists in defining the GOPs and the types of images constituting the GOPs according to the cards of use and the second phase consists in coding the images according to the cards of use calculated.

The invention claimed is:

1. Method for coding a sequence of pictures arranged in groups of pictures, wherein each group of pictures GOP comprises pictures of different picture types including a P picture type, and wherein a picture comprises multiple picture entities, said method comprising the steps:

calculating a backward motion vector field of a picture k−s and/or a forward motion vector field of a picture k+p, corresponding to a motion estimation for entities of picture k−s with respect to a following picture k and/or of picture k+p with respect to a previous picture k, respectively, s and p being non zero natural integers;

calculating a rate of use of entities of picture k for a backward predictive coding of picture k−s, according to the number of vectors of backward motion vector field of picture k−s pointing to the entity of picture k or in its near surroundings, and/or calculating a rate of use of entities of picture k for a forward predictive coding of picture k+p, according to the number of vectors of forward motion vector field of picture k+p pointing to the entity of picture k or in its near surroundings;

calculating, for a predictive coding and/or for a future coding, a rate of use for picture k, according to the rates of use assigned to the entities of said picture k;

performing the above steps for other pictures of said picture sequence;

defining picture classes depending on whether the future rate of use is noticeably greater than the past rate of use, or is in the same order as the past rate of use, or is noticeably lower than the past rate of use, and classifying the pictures correspondingly;

determining ranges of pictures constituted by a predefined minimum number of successive pictures of same class;

organizing a GOP by imposing reference pictures of type P at the extremes of determined ranges.

2. Method according to claim 1, wherein the rate of use is also dependent upon the spatial distribution of the extremes of motion vectors in picture k, either of backward motion vector field of picture k−s, or of the forward motion vector field of picture k+p.

3. Method according to claim 2, wherein rate of use calculated for an entity (i,j) of picture k is obtained according to the following steps:

determining, for a predetermined zone around this entity (i,j), the extremes of motion vectors of vector field of picture k−s or k+p, calculating a rate of use for said entity (i,j) in accordance with the number of extremes in said zone and calculating for each extremity the distance from this extremity to said entity (i,j).

4. Method according to claim 1, wherein iteratively for a group of P pictures preceding picture k, P being a non zero natural integer, for the calculation of rate of use for a backward predictive coding, the motion vector fields are calculated for these pictures, or wherein iteratively depending on the picture k, for the calculation of a rate of use for a forward predictive coding, the motion vector field is calculated for this picture, and wherein rate of use of an entity (i,j) of picture of said group of P pictures is calculated according to the rate of use of said entity (i,j) of previous picture or the following picture, respectively, origin of motion vector whose extremity is assigned to said entity (i,j) of said picture of said group of P pictures.

5. Method according to claim 4, wherein rate of use of an entity of previous or following, respectively, picture is temporally weighted so as to give less importance to the pictures furthest from picture k.

6. Method according to claim 1, wherein coding mode, such as inter mode and intra mode, of an entity of picture is selected according to its rate of use.

7. Method according to claim 1, wherein a coding parameter, such as quantizing step, picture block size, bit-rate-distortion criteria, number of AC coefficients coded, weighting matrix, of an entity of picture is calculated according to its rate of use.

8. Method according to claim 1, wherein a picture entity is a picture block that is sub-sampled such that a pixel of sampled picture corresponds to an image entity and wherein entity motion estimation is carried out at the level of such sampled picture pixel.

9. Method according to claim 1, wherein a picture entity is a pixel and the picture coding depends on the average value of rates assigned to the pixels of picture.

10. Method according to claim 1, wherein additional reference pictures of type P are placed within ranges surrounded by reference pictures of type P if these ranges have a length greater than a predefined value.

11. Method according to claim 10, wherein coding mode of the pictures depends on the range class to which they belong.

\* \* \* \* \*